(12) United States Patent
von Moltke et al.

(10) Patent No.: US 11,646,648 B2
(45) Date of Patent: May 9, 2023

(54) TOOL AND METHOD FOR FITTING A STATOR INTO A HOUSING

(71) Applicant: Vitesco Technologies GmbH, Hannover (DE)

(72) Inventors: Bodo von Moltke, Munich (DE); Tobias Döring, Munich (DE); Johannes Becker, Munich (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 16/763,729

(22) PCT Filed: Nov. 9, 2018

(86) PCT No.: PCT/EP2018/080841
§ 371 (c)(1),
(2) Date: May 13, 2020

(87) PCT Pub. No.: WO2019/096710
PCT Pub. Date: May 23, 2019

(65) Prior Publication Data
US 2020/0366174 A1     Nov. 19, 2020

(30) Foreign Application Priority Data
Nov. 16, 2017   (DE) ...................... 10 2017 220 424.9

(51) Int. Cl.
*H02K 15/14*        (2006.01)
(52) U.S. Cl.
CPC .................... *H02K 15/14* (2013.01)
(58) Field of Classification Search
CPC .................................................. H02K 15/14
See application file for complete search history.

(56) References Cited

U.S. PATENT DOCUMENTS

| 4,263,710 A | 4/1981 | Marracino ...................... 29/596 |
| 4,875,270 A | 10/1989 | Krips ........................... 29/421.1 |

(Continued)

FOREIGN PATENT DOCUMENTS

| CN | 102884715 A | 1/2013 | ............... H02K 1/18 |
| CN | 205811813 U | 12/2016 | ............. H02K 15/06 |

(Continued)

OTHER PUBLICATIONS

Chinese Office Action, Application No. 201880071239.4, 11 pages.

(Continued)

*Primary Examiner* — Peter Dungba Vo
*Assistant Examiner* — Jose K Abraham
(74) *Attorney, Agent, or Firm* — Slayden Grubert Beard PLLC

(57) ABSTRACT

Various embodiments include a tool for fitting a stator into a housing comprising: a housing mounting; a tool holder; and a stator gripper. The housing mounting includes a positioning device for holding the housing. The tool holder defines a tool holder volume and has a receiving opening. The stator gripper is arranged in the tool holder and moves between a first position and a second position. The stator gripper comprises a gripper head for holding the stator, in the first position, the gripper head is arranged in the tool holder volume and, in the second position, the gripper head is guided, at least in one section, through the receiving opening. The housing mounting and/or the tool holder move toward one another or away from one another. The housing mounting or the tool holder or the stator gripper includes a pressure medium feed opening.

10 Claims, 3 Drawing Sheets

(56) References Cited

U.S. PATENT DOCUMENTS

| | | | |
|---|---|---|---|
| 6,098,273 A | 8/2000 | Fernandez | 29/732 |
| 6,942,029 B2 | 9/2005 | Simpson | 166/207 |
| 7,055,238 B2 | 6/2006 | Spielmannleitner | 29/520 |
| 7,363,696 B2 | 4/2008 | Kimura | 29/596 |
| 8,347,484 B2 | 1/2013 | Bischel | 29/596 |
| 8,683,673 B2 | 4/2014 | Akimoto | 29/596 |
| 9,391,483 B2* | 7/2016 | Kaneko | H02K 5/1732 |
| 9,806,566 B2 | 10/2017 | Nagao | H02K 3/34 |
| 10,298,089 B2 | 5/2019 | Takabe | H02K 5/24 |
| 2006/0103257 A1* | 5/2006 | Stratico | H02K 15/022 |
| | | | 29/606 |
| 2009/0077789 A1* | 3/2009 | Tokizawa | H02K 15/026 |
| | | | 29/596 |
| 2010/0000075 A1* | 1/2010 | Akimoto | H02K 15/024 |
| | | | 29/596 |
| 2011/0099797 A1* | 5/2011 | Mishina | H02K 15/067 |
| | | | 29/596 |
| 2012/0186072 A1* | 7/2012 | Yoshikawa | H02K 15/00 |
| | | | 29/596 |
| 2013/0033148 A1 | 2/2013 | Vetter | 310/216.113 |
| 2014/0062249 A1* | 3/2014 | Nagao | B21D 53/00 |
| | | | 310/216.089 |
| 2014/0252769 A1* | 9/2014 | Menheere | H02K 7/1823 |
| | | | 415/124.2 |
| 2017/0141660 A1* | 5/2017 | Hashimoto | H02K 15/085 |

FOREIGN PATENT DOCUMENTS

| | | | | |
|---|---|---|---|---|
| CN | 106787482 A * | 5/2017 | | |
| DE | 697 13 738 | 4/1998 | | H02K 15/02 |
| DE | 697 13 738 | 2/2003 | | |
| DE | 10 2004 034 856 | 2/2006 | | H02K 15/14 |
| DE | 10 2013 217 021 | 3/2014 | | H02K 1/16 |
| DE | 11 2015 003 021 | 6/2017 | | F04B 39/00 |
| GB | 1 351 769 | 5/1974 | | H02K 5/02 |
| JP | 07231620 A | 8/1995 | | H02K 15/02 |
| JP | 2008 236893 | 10/2008 | | H02K 15/02 |
| JP | 2011 213103 | 10/2011 | | B29C 45/02 |

OTHER PUBLICATIONS

Search Report for International Application No. PCT/EP2018/080841, 16 pages, dated Feb. 26, 2019.

Office Action for DE Application No. 10 2017 220 424.9, 7 pages, dated Oct. 15, 2018.

* cited by examiner

TOOL AND METHOD FOR FITTING A STATOR INTO A HOUSING

CROSS-REFERENCE TO RELATED APPLICATIONS

This application is a U.S. National Stage Application of International Application No. PCT/EP2018/080841 filed Nov. 9, 2018, which designates the United States of America, and claims priority to DE Application No. 10 2017 220 424.9 filed Nov. 16, 2017, the contents of which are hereby incorporated by reference in their entirety.

TECHNICAL FIELD

The present disclosure relates to electric machines. Various embodiments include tools and/or methods for fitting a stator of an electric machine into a housing.

BACKGROUND

A stator of an electric machine is fitted into a housing such that the housing surrounds the stator and the stator is arranged in frictional engagement and/or nonpositive engagement in the housing. For this purpose, the housing may be heated thermally, as a result of which the housing wall undergoes an expansion, starting from an initial position. Owing to the increase in the housing circumference due to the thermal heating, the stator can be inserted through an opening arranged in the housing. After the stator has been positioned in the housing, the housing is cooled, with the result that the previously expanded housing wall contracts again in the direction of the initial position, and the stator rests against an inner lateral surface of the housing wall and is connected to the latter by frictional engagement.

The disadvantage with this known and often practiced method is that the housing has to be heated and then cooled again in order to fit the stator in the housing. The heating process and the cooling process are time-consuming, and therefore the cycle rate at which a stator can be fitted into a housing is reduced. In addition, a correspondingly large storage surface has to be provided for cooling the housing before the next machining and/or processing step, and this may give rise to additional costs as regards the provision of the required space for the production operation.

SUMMARY

The teachings of the present disclosure describe tools and methods by means of which the production costs for fitting a stator can be reduced and the cycle rate for fitting a stator into a housing can be increased. The various aspects of the description and the figures work both individually and in combination. Here, all combinations as well as isolated combinations between the features of the tool and of the method may be utilized together. Furthermore, in each case, provision is also made, and it is possible, for individual or multiple features of the tool and of the method to be combined with one another as desired.

As an example, some embodiments of the teachings herein include a tool (10) for fitting a stator (12) into a housing (14), having a housing mounting (16), a tool holder (18) and a stator gripper (20), wherein the housing mounting (16) has a positioning device (22) for holding and positioning the housing (14), the tool holder (18) surrounds a tool holder volume (26) and has a receiving opening (28), the stator gripper (20) is arranged in the tool holder (18) and is designed to be movable between a first position and a second position, and comprises a gripper head (32) for holding the stator (12), wherein, in the first position, the gripper head (32) is arranged in the tool holder volume (26) and, in the second position, the gripper head (32) is guided, at least in one section, through the receiving opening (28), the housing mounting (16) and/or the tool holder (18) are/is designed to be movable, with the result that the housing mounting (16) and/or the tool holder (18) are/is movable toward one another and away from one another, and the housing mounting (16) and/or the tool holder (18) and/or the stator gripper (20) have/has a pressure medium feed opening (40).

In some embodiments, the tool holder (18) is designed as a hollow cylinder, and the receiving opening (28) is arranged in the axial direction of the tool holder (18).

In some embodiments, the stator gripper (20) has a shank (30) connected to and/or adjoining the gripper head (32), said shank being guided in a guide opening (34) of the tool holder (18), said guide opening being arranged at a distance in the axial direction from the receiving opening (28).

In some embodiments, a cross section of the gripper head (32) can be varied in a direction perpendicular to its direction of movement between a gripping position that enlarges the cross section and a release position that reduces the cross section.

In some embodiments, the pressure medium feed opening (40) has a valve device.

In some embodiments, the valve device has a pressure relief valve.

As another example, some embodiments include a method for fitting a stator (12) into a housing (14), comprising the following steps: positioning the housing (14), which has an insertion opening 36 and surrounds a housing volume (38), in a housing mounting (16); moving the housing mounting (16) and/or a tool holder (18), which has a receiving opening (28) and surrounds a tool holder volume (26), in such a way that the insertion opening (36) and the receiving opening (28) end in medium-tight contact with one another and the housing volume (38) and the tool holder volume (26) are connected to one another; applying an internal pressure to the housing volume (38) and to the tool holder volume (26) by means of a pressure medium in such a way that a housing wall (42) surrounding the housing volume (38) is expanded elastically in the circumferential direction, at least in one section; moving a stator gripper (20), which is arranged in the tool holder volume (26) of the tool holder (18) and holding a stator (12), through the insertion opening (36) into the housing volume (38); and discharging the applied internal pressure, whereby the stator (12) is clamped to an inner lateral surface (46) of the housing wall (42) surrounding the housing volume (38).

In some embodiments, the housing mounting (16) and/or the tool holder (18) are/is moved in an axial direction to connect the housing volume (38) to the tool holder volume (26) and/or to release the housing (14).

In some embodiments, the tool holder (18) and/or the housing mounting (16) are/is moved in such a way for the medium-tight closure between the tool holder (18) and the housing (14) that at least one section of the housing (14), together with the insertion opening (36), is guided and/or engages into the receiving opening (28), or a holder tool end, surrounding the receiving opening (28), of the holder wall (24) surrounding the tool holder volume (26) rests against a housing end, surrounding the insertion opening (36), of the housing wall (42) surrounding the housing volume (38).

In some embodiments, to build up the internal pressure in the housing volume (38) and the tool holder volume (26), the pressure medium is fed to the housing volume (38) and the tool holder volume (26) via a pressure medium feed opening (40) arranged in the tool holder (18) and/or the housing mounting (16) and/or in the stator gripper (20), preferably via a valve device.

In some embodiments, the stator (12) is held on the stator gripper (20) by means of a gripper head (32) that is expandable in the radial direction.

BRIEF DESCRIPTION OF THE DRAWINGS

Further features and advantages of the various embodiments of the teachings of the present disclosure emerge from the following exemplary embodiments. The exemplary embodiments are to be understood not as restrictive, but rather as examples. They are intended to enable a person skilled in the art to carry out the teachings herein. The exemplary embodiments are discussed in more detail with reference to figures, in which.

DETAILED DESCRIPTION

Figure 1:
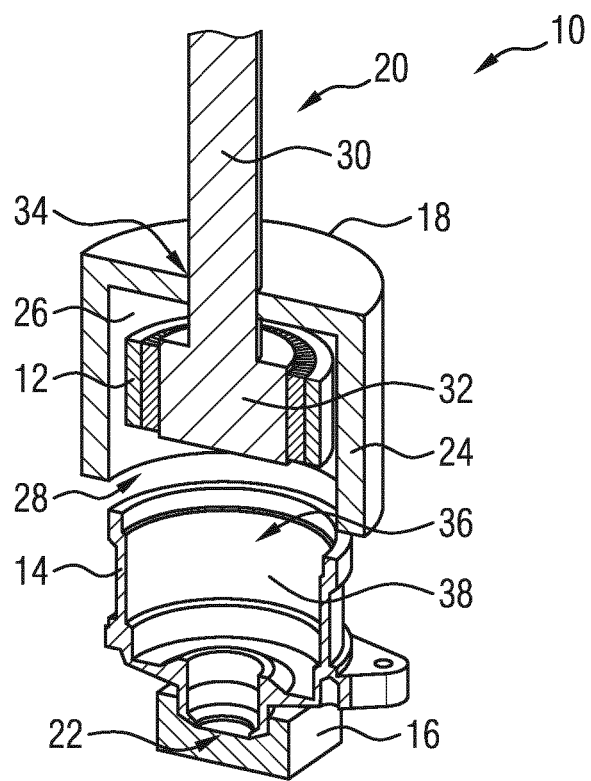
FIG. 1 shows a tool for fitting a stator into a housing, wherein the tool has a housing mounting, a tool holder, and a stator gripper, incorporating teachings of the present disclosure.
Figure 2:
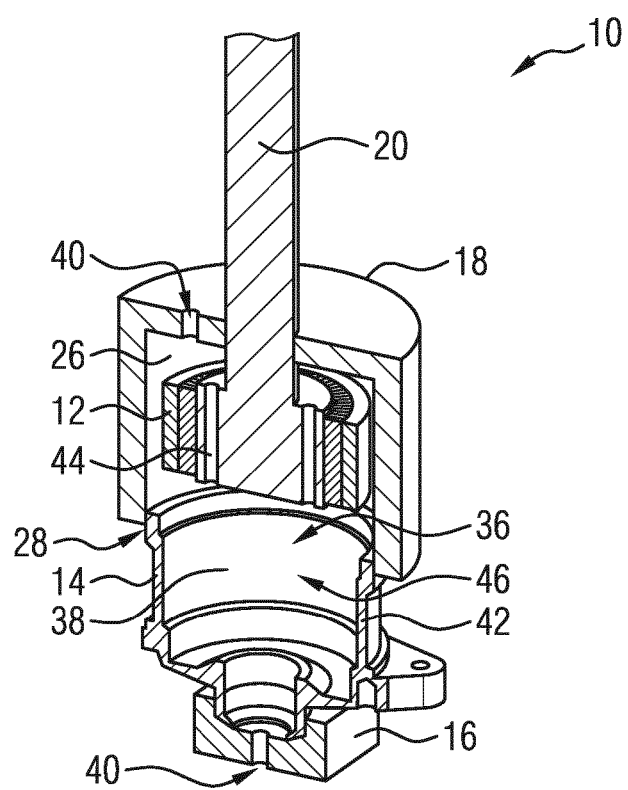
FIG. 2 shows the tool, wherein the tool holder is closed with or connected to the housing in a medium-tight manner, incorporating teachings of the present disclosure.

The teachings of the present disclosure describe tools and methods for fitting a stator into a housing. In some embodiments, a tool includes a housing mounting, a tool holder, and a stator gripper, wherein the housing mounting has a positioning device for holding and positioning the housing, the tool holder surrounds a tool holder volume and has a receiving opening, the stator gripper is arranged in the tool holder and is designed to be movable between a first position and a second position, and comprises a gripper head for holding a stator, wherein, in the first position, the gripper head is arranged in the tool holder volume and, in the second position, the gripper head is guided, at least in one section, through the receiving opening, the housing mounting and/or the tool holder are/is designed to be movable, with the result that the housing mounting and/or the tool holder are/is movable toward one another and away from one another, and the housing mounting and/or the tool holder and/or the stator gripper have/has a pressure medium feed opening.

In some embodiments, the tool comprises a housing mounting, a tool holder, and a stator gripper. The housing mounting has a positioning device for holding and positioning a housing. The positioning device may include a depression and/or as a negative shape of an external contour of the housing in the housing mounting, thus enabling the housing to be positioned securely in place in the housing mounting by means of the positioning device.

In some embodiments, the tool holder includes a holder wall, which surrounds a volume of the tool holder, i.e. a tool holder volume. The tool holder furthermore has a receiving opening, via which the tool holder volume is accessible.

In some embodiments, the stator gripper is arranged in the tool holder and has a gripper head for holding a stator. The stator gripper is designed to be movable between a first position and a second position, wherein, in the first position, the gripper head is arranged in the tool holder volume and, in the second position, the gripper head is guided, at least in one section, through the receiving opening. This means that the gripper head can be guided through the receiving opening of the housing together with the stator. Thus, the gripper head can be passed out of the tool holder volume and/or can protrude from the tool holder.

In some embodiments, the housing mounting and/or the tool holder are/is designed to be movable, with the result that the housing mounting and/or the tool holder are/is movable or shiftable toward one another and away from one another. Thus, the tool holder can preferably be shifted in the direction of a housing mounting of fixed design. In some embodiments, the tool holder is of fixed design and for the housing mounting to be of movable design. In some embodiments, both the tool holder and the housing mounting are movable. In this way, if the housing is arranged in the positioning device of the housing mounting, the tool holder can preferably be moved in the direction of the housing, with the result that the receiving opening of the tool holder ends in a medium-tight manner with an insertion opening formed in the housing. The tool holder volume can thus be connected to a volume of the housing, in particular a housing volume.

In some embodiments, the housing mounting and/or the tool holder and/or the stator gripper have/has a pressure medium feed opening, via which a pressure medium, e.g. air, in particular compressed air, can be fed to the tool holder volume and the housing volume. In some embodiments, the pressure medium can be a fluid, in particular an oil. Through the application of an excess pressure in the housing and the tool holder, a housing wall of the housing, said housing wall surrounding the housing volume, can undergo an elastic expansion in the circumferential direction, thus enabling the stator to be inserted into the housing via the insertion opening of the housing by a movement of the stator gripper from the first position to the second position.

In some embodiments, there is a tool for fitting a stator into a housing, in which it is possible to dispense with the initially mentioned time-consuming heating process and subsequent cooling process. In this way, the cycle rate for fitting the stator into a housing can be increased. Moreover, it is possible to dispense with the necessary space requirement for cooling previously heated housings, thereby making it possible to reduce storage costs.

In some embodiments, the tool holder can be of any desired design. In some embodiments, the tool holder has a bell-shaped configuration. In some embodiments, the tool holder is designed as a hollow cylinder, and the receiving opening is arranged in the axial direction of the tool holder. Thus, it is possible to make available a tool holder with an appropriate internal volume which, on the one hand, can use the stator gripper to pick up the annular stator for fitting into the housing and, on the other hand, can have a geometry which is stiff in respect of deformation by virtue of the hollow-cylindrical configuration. Moreover, it is possible to increase the structural stiffness of the tool holder by increasing the wall thickness of the hollow-cylindrical tool holder.

In some embodiments, the stator gripper can be arranged and formed in the tool holder in such a way that the stator gripper is designed to be movable through the receiving opening. In some embodiments, the stator gripper has a shank connected to and/or adjoining the gripper head, said shank being guided in a guide opening of the tool holder, said guide opening being arranged at a distance in the axial direction from the receiving opening. The shank can thus be moved through the receiving opening in the axial direction of the tool holder. The direction of movement of the shank corresponds substantially to the direction of movement of the tool holder and/or to the direction of movement of the housing mounting.

In some embodiments, the gripper head can have means and/or devices for gripping and/or releasing the stator. In some embodiments, a cross section of the gripper head can be varied in a direction perpendicular to its direction of movement between a gripping position or holding position that enlarges the cross section and a release position that reduces the cross section. In this way, it is possible, by inserting the gripper head and by a corresponding change in the cross section of the gripper head, for the stator of annular design to be picked up, held and/or released.

In some embodiments, the pressure medium feed opening is configured and designed to enable a pressure medium to be introduced into the housing volume and the tool holder volume. In some embodiments, the pressure medium feed opening has a valve device. In some embodiments, the valve device may be designed in such a way that the pressure medium is fed to the housing volume and the tool holder volume via the valve device, and can also be discharged again via the valve device. In this way, the pressure medium can be fed in and discharged via just one valve device.

In some embodiments, the valve device has a pressure relief valve. In this case, the pressure relief valve is dimensioned in such a way that it opens when there is a critical pressure prevailing within the housing volume and/or the tool holder volume. A critical pressure may include a pressure which could entail a plastic deformation of the housing wall. The critical pressure can be based on empirical values. In some embodiments, the expansion of the housing or of the housing wall surrounding the housing volume to be monitored by means of one or more measuring devices, e.g. by means of at least one strain gauge or an optical measuring device. Thus, the risk of damaging the housing due to the applied excess pressure can be reduced and/or prevented.

In some embodiments, the measuring device can be configured and designed in such a way that it is designed for control of the pressure relief valve. In some embodiments, the measuring device can be configured to move and/or control the stator gripper. In this way, when the measuring device detects an expansion of the housing wall surrounding the housing volume, beyond which the stator can be inserted into the housing, the stator can be moved automatically from the first position to the second position. As soon as the applied internal pressure declines and/or is reduced, and the measuring device detects a contraction of the previously expanded housing wall or exceeds a threshold value, the gripper head can change the cross section from the gripping position to the release position, thus ensuring that the stator is released from the gripper head. Subsequently, the stator gripper can be moved automatically from the second position to the first position. Thus, the cycle rate for fitting the stator into the housing can be increased by means of the measuring device.

In some embodiments, a method for fitting a stator into a housing, comprises:

positioning the housing, which has an insertion opening and surrounds a housing volume, in a housing mounting;

moving the housing mounting and/or a tool holder, which has a receiving opening and surrounds a tool holder volume, in such a way that the insertion opening and the receiving opening end in medium-tight contact with one another and the housing volume and the tool holder volume are connected to one another;

applying an internal pressure to the housing volume and to the tool holder volume by means of a pressure medium in such a way that a housing wall surrounding the housing volume is expanded elastically in the circumferential direction, at least in one section;

moving a stator gripper, which is arranged in the tool holder volume of the tool holder and holding a stator, through the insertion opening into the housing volume; and discharging and/or reducing the applied internal pressure, whereby the stator is clamped to an inner lateral surface of the housing wall surrounding the housing volume.

In some embodiments, a housing is first of all positioned in the housing mounting. Following this, either the housing mounting and/or the tool holder are moved in such a way that the insertion opening of the housing ends in a medium-tight manner with the receiving opening of the tool holder. In this way, the housing volume and the tool holder volume can be connected to one another in a medium-tight manner. As soon as there is a medium-tight connection between the housing and the tool holder, a pressure medium, e.g. air, in particular compressed air, is introduced into the housing volume and the tool holder volume. In some embodiments, the pressure medium is a fluid, in particular an oil. Owing to the pressure buildup, at least a housing wall surrounding the housing volume undergoes an expansion, in particular an elastic expansion.

By virtue of the cross-sectional expansion of the housing due to the expansion of the housing wall, the stator can now be positioned in the housing by a movement of the stator gripper from the first position to the second position. The gripper head of the stator gripper releases its connection to the stator, and therefore the stator remains in the housing. Following this, the pressure is released from the housing volume and the tool holder volume, the stator gripper is moved from the second position to the first position, and the tool holder is moved to release the housing. Owing to the pressure reduction, the previously elastically expanded housing wall contracts and clamps the stator to an inner lateral surface of the housing, with the result that the stator is held at least by frictional engagement in the housing.

In some embodiments, no time-consuming heating and/or cooling of the housing by the method described herein is required, as a result of which production costs for the method for fitting the stator in the housing can be lowered, and the production process can be accelerated. In some embodiments, the housing mounting and/or the tool holder are/is moved in an axial direction to connect the housing volume to the tool holder volume and/or to release the housing. In this way, a method is provided in which the housing can be closed off by or connected to the tool holder volume in a medium-tight manner and/or correspondingly released with short unidirectional shifting movements.

In some embodiments, the tool holder and/or the housing mounting are/is moved in such a way for the medium-tight closure between the tool holder and the housing that at least one section of the housing, together with the insertion opening, is guided and/or engages into the receiving opening, or a holder tool end, surrounding the receiving opening, of the holder wall surrounding the tool holder volume rests against a housing end, surrounding the insertion opening, of the housing wall surrounding the housing volume. In some embodiments, corresponding seals may be arranged and formed between the respective abutting surfaces in order to effect and/or provide a required leaktightness.

In some embodiments, to build up the internal pressure in the housing volume and the tool holder volume, the pressure medium is fed to the housing volume and the tool holder volume via a pressure medium feed opening arranged in the tool holder and/or the housing mounting and/or in the stator gripper, e.g. via a valve device. The valve assembly for introducing the pressure medium can thus be arranged and/or formed at various points in the tool.

In some embodiments, the stator is held on the stator gripper by means of a gripper head that is expandable in the radial direction. In this way, the stator can be held, positioned, and closed off, and also released again, in a simple manner by means of the gripper head.

FIG. 1 shows a tool 10 for fitting a stator 12 into a housing 14. The tool 10 comprises a housing mounting 16, a tool holder 18 and a stator gripper 20. The housing mounting 16 has a positioning device 22 for holding and positioning the housing 14. In some embodiments, the positioning device 22 is designed as a depression in the form of a negative shape of an external contour of the housing 14, thus enabling the housing 14 to be positioned securely in place in the housing mounting 16 by means of the positioning device 22.

The tool holder 18 has a holder wall 24, which surrounds a volume of the tool holder 18, i.e. a tool holder volume 26. The tool holder 18 furthermore has a receiving opening 28, via which the tool holder volume 26 is accessible. In some embodiments, the tool holder 18 has a hollow-cylindrical configuration, wherein the receiving opening 28 is arranged and/or formed in the axial direction of the tool holder 18. In this way, a geometry of the tool holder 18 which is stiff in respect of deformation can be provided. The structural stiffness of the tool holder 18 can be increased by increasing the wall thickness of the holder wall 24.

The stator gripper 20 is arranged in the tool holder 18 and has a shank 30 and a gripper head 32, adjoining the shank 30, for picking up the stator 12. The stator gripper 20 is designed to be movable between a first position and a second position, wherein, in the first position, the gripper head 32 is arranged in the tool holder volume 26 and, in the second position, the gripper head 32 is guided, at least in one section, through the receiving opening 28. For this purpose, the shank 30 is guided in a guide opening 34 of the tool holder 18, said guide opening being arranged at a distance in the axial direction from the receiving opening 28. The shank 30 can thus be moved through the receiving opening 28 in the axial direction of the tool holder 18.

The housing mounting 16 and/or the tool holder 18 are/is designed to be movable, with the result that the housing mounting 16 and/or the tool holder 18 are/is movable toward one another and away from one another. In the exemplary embodiment under consideration, the housing mounting 16 is of fixed design, and only the tool holder 18 is designed to be movable in the axial direction.

In FIG. 2 to FIG. 5, the tool 10 known from FIG. 1 is shown, wherein different states of the tool 10 for arranging the stator 12 in the housing 14 are shown in FIG. 2 to FIG. 5. From FIG. 2, it can be seen that the tool holder 18 has been moved in the direction of the housing 14, and the receiving opening 28 of the tool holder 18 ends with or is connected to an insertion opening 36 formed in the housing 14 in a medium-tight manner. The tool holder volume 26 can thus be connected to a volume of the housing 14, in particular a housing volume 38.

Figure 3:
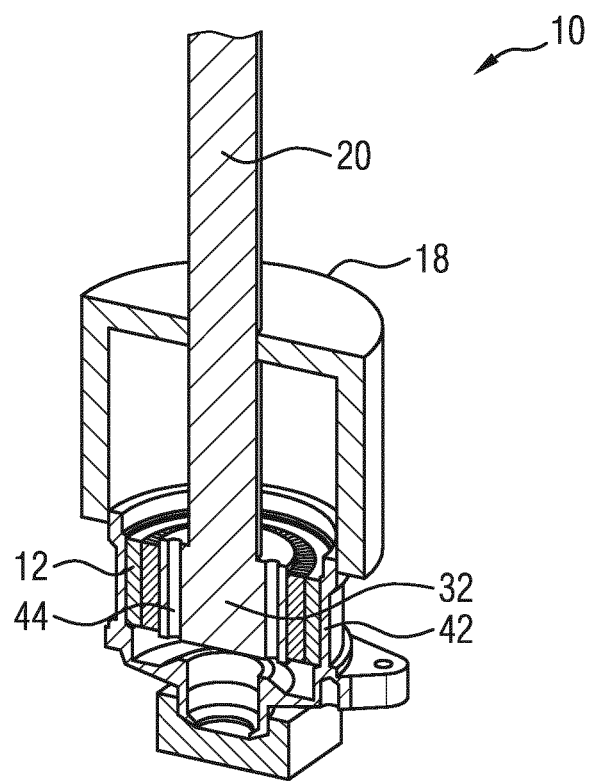
FIG. 3 shows the tool, wherein the stator gripper has been moved into the housing, incorporating teachings of the present disclosure.

The housing mounting 16 or the stator gripper 20 has a pressure medium feed opening 40, via which a pressure medium, e.g. air, in particular compressed air, can be fed to the tool holder volume 26 and the housing volume 38. Owing to the pressure buildup, at least one housing wall 42 surrounding the housing volume 38 undergoes an expansion, in particular an elastic expansion, in the circumferential direction, as a result of which the cross section of the housing 14 is enlarged or expanded at least temporarily, thus enabling the stator 12 to be inserted into the housing 14 via the insertion opening 36 of the housing 14 by a movement of the stator gripper 20 from the first position to the second position, as shown in FIG. 3. From FIGS. 2 and 3, it can furthermore be seen that the wall thickness of the holder wall 24 is greater than the wall thickness of the housing wall 42. Thus, the tool holder has an enhanced structural property in comparison with the housing 14, and therefore it is predominantly the housing wall 42 which undergoes an expansion in the circumferential direction when there is a pressure increase in the housing volume 38 and in the tool holder volume 26.

Thus, a tool 10 for fitting a stator 12 into a housing 14, in which it is possible to dispense with a time-consuming heating process to expand the housing 14 in the cross-sectional direction and a subsequent cooling process, is provided. In this way, the cycle rate for fitting the stator 12 into a housing 14 can be increased. Moreover, it is possible to dispense with the necessary space requirement for cooling previously heated housings 14, thereby making it possible to reduce storage costs.

To ensure that the pressure medium introduced into the housing volume 38 or the tool holder volume 26 via the pressure medium feed opening 40 can be exchanged between the housing volume 38 and the tool holder volume 26, especially during a movement of the stator gripper 20 from the first position to the second position, it is envisaged that at least one through channel element 44 is formed in the stator gripper 20 and/or in the gripper head 32.

After the stator gripper 20 has been moved from the first position to the second position in order to position the stator 12 in the housing 14, as shown in FIG. 3, the applied pressure is reduced and/or discharged from the housing volume 38 and the tool holder volume 26. Owing to the pressure reduction, the previously elastically expanded housing wall 42 contracts and clamps the stator 12 to an inner lateral surface 46 of the housing 14, with the result that the stator 12 is held at least by frictional engagement in the housing 14.

Figure 4:
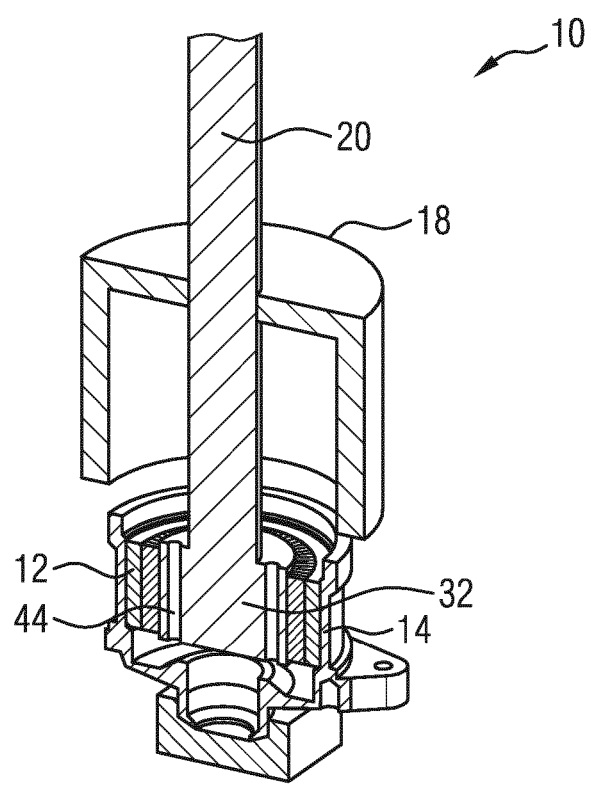
FIG. 4 shows the tool, wherein the tool holder is releasing the housing, incorporating teachings of the present disclosure.
Figure 5:
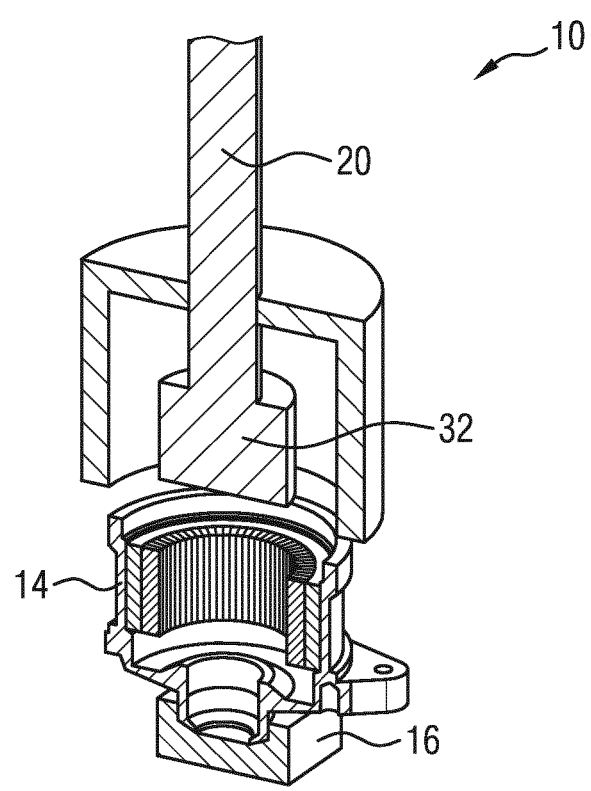
FIG. 5 shows the tool, wherein the stator gripper has been moved into the tool holder, incorporating teachings of the present disclosure.

Finally, as shown in FIG. 4 and FIG. 5, the tool holder 18 is moved back into the initial position after the release of the pressure applied, in order to release the housing 14. Moreover, the cross section of the gripper head 32 is reduced in order to release the stator 12 from the gripper head 32. Subsequently, the stator gripper 20 can be moved from the second position to the first position. The housing 14 can thus be removed from the housing mounting 16, and a new housing 14 can be positioned in the housing mounting 16 in order to fit the stator 12 in the housing 14.

REFERENCE SIGNS

10 Tool
12 Stator
14 Housing
16 Housing mounting
18 Tool holder
20 Stator gripper 22 Positioning device
24 Holder wall
26 Tool holder volume
28 Receiving opening
30 Shank
32 Gripper head
32 Guide opening
36 Insertion opening
38 Housing volume
40 Pressure medium feed opening
42 Housing wall
44 Channel element
46 Inner lateral surface

What is claimed is:

1. A tool for fitting a stator into a housing, the tool comprising:
   a housing mounting;
   a tool holder; and
   a stator gripper with a gripper head for holding the stator from within an interior of the stator;
   wherein the housing mounting includes a positioning device for holding and positioning the housing;
   the tool holder defines a tool holder volume and has a receiving opening;
   the stator gripper is arranged in the tool holder and moves between a first position and a second position, in the first position, the gripper head is arranged in the tool holder volume and, in the second position, the gripper head is guided, at least in one section, through the receiving opening;
   the housing mounting and the tool holder move toward one another or away from one another; and
   the housing mounting or the tool holder or the stator gripper includes a pressure medium feed opening;
   wherein feeding a pressure medium through the pressure medium feed opening applies an internal pressure to an inner lateral surface of a housing wall; and
   discharging the applied internal pressure clamps the stator to the inner lateral surface of the housing wall surrounding the housing volume;
   wherein a cross section of the gripper head can be adjusted in a direction perpendicular to its direction of movement between a gripping position that enlarges the cross section and a release position that reduces the cross section.

2. The tool as claimed in claim 1, wherein:
   the tool holder comprises a hollow cylinder; and
   the receiving opening is arranged in the axial direction of the tool holder.

3. The tool as claimed in claim 1, wherein the stator gripper includes a shank adjoining the gripper head, the shank guided in a guide opening of the tool holder, said guide opening arranged at a distance in the axial direction from the receiving opening.

4. The tool as claimed in claim 1, wherein the pressure medium feed opening includes a valve device.

5. The tool as claimed in claim 4, wherein the valve device comprises a pressure relief valve.

6. A method for fitting a stator into a housing, the method comprising:
   positioning the housing in a housing mounting, wherein the housing includes an insertion opening and defines a housing volume;
   moving the housing mounting and/or a tool holder with a receiving opening and defining a tool holder volume, wherein the insertion opening and the receiving opening end in contact with one another and the housing volume and the tool holder volume are connected to one another;
   applying an internal pressure to the housing volume and to the tool holder volume using a pressure medium so a housing wall surrounding the housing volume expands elastically in the circumferential direction, at least in one section;
   moving a stator gripper arranged in the tool holder volume of the tool holder and holding a stator, through the insertion opening into the housing volume, wherein the stator gripper includes a gripper head for holding the stator from within an interior of the stator;
   discharging the applied internal pressure, whereby the stator is clamped to an inner lateral surface of the housing wall surrounding the housing volume;
   wherein a cross section of the gripper head can be adjusted in a direction perpendicular to its direction of movement between a gripping position that enlarges the cross section and a release position that reduces the cross section.

7. The method as claimed in claim 6, further comprising moving the housing mounting and/or the tool holder in an axial direction to connect the housing volume to the tool holder volume or to release the housing.

8. The method as claimed in claim 6, further comprising moving the tool holder and/or the housing mounting in such a way for the closure between the tool holder and the housing so that at least one section of the housing, together with the insertion opening, is guided and/or engages into the receiving opening, or
   a tool holder end, surrounding the receiving opening, of a holder wall surrounding the tool holder volume rests against a housing end, surrounding the insertion opening, of the housing wall surrounding the housing volume.

9. The method as claimed in claim 6, further comprising feeding the pressure medium to the housing volume and the tool holder volume to build up the internal pressure in the housing volume and the tool holder volume via a pressure medium feed opening arranged in the tool holder or the housing mounting or in the stator gripper.

10. The method as claimed in claim 6, wherein the stator is held on the stator gripper by a gripper head expandable in the radial direction.

* * * * *